United States Patent
Pensa

[15] 3,656,820
[45] Apr. 18, 1972

[54] WEAR COMPENSATING SEAL

[72] Inventor: Pietro Pensa, Milan, Italy

[73] Assignee: Massey-Ferguson Services N.V., Curacao, Netherlands

[22] Filed: May 8, 1968

[21] Appl. No.: 727,425

[30] Foreign Application Priority Data

May 20, 1967 Italy....................16335 A/67

[52] U.S. Cl..................308/36.1, 277/30, 277/92, 277/100
[51] Int. Cl..............................F16j 15/16, F16k 41/00
[58] Field of Search................277/30, 5, 92, 100; 308/36.1

[56] References Cited

UNITED STATES PATENTS

| | | | |
|---|---|---|---|
| 2,758,548 | 8/1956 | Rockwell | 277/30 X |
| 2,860,895 | 11/1958 | Mosbacher | 277/30 UX |
| 3,050,310 | 8/1962 | Kuiken | 277/30 |
| 3,239,232 | 3/1966 | Andresen | 277/30 X |
| 3,409,306 | 11/1968 | Hayatian | 277/92 |

FOREIGN PATENTS OR APPLICATIONS 626,708   9/1961   Canada..................277/30

*Primary Examiner*—Samuel Rothberg
*Attorney*—Gerhardt, Greenlee & Farris

[57] ABSTRACT

A seal assembly for a bearing wherein two relatively rotatable annular matched members have planar face-to-face sealing contact surfaces resiliently urged together and one of the members is mounted for limited spherical rocking movement about a point on the sealing surface plane and on the axis of relative rotation between the members.

10 Claims, 1 Drawing Figure

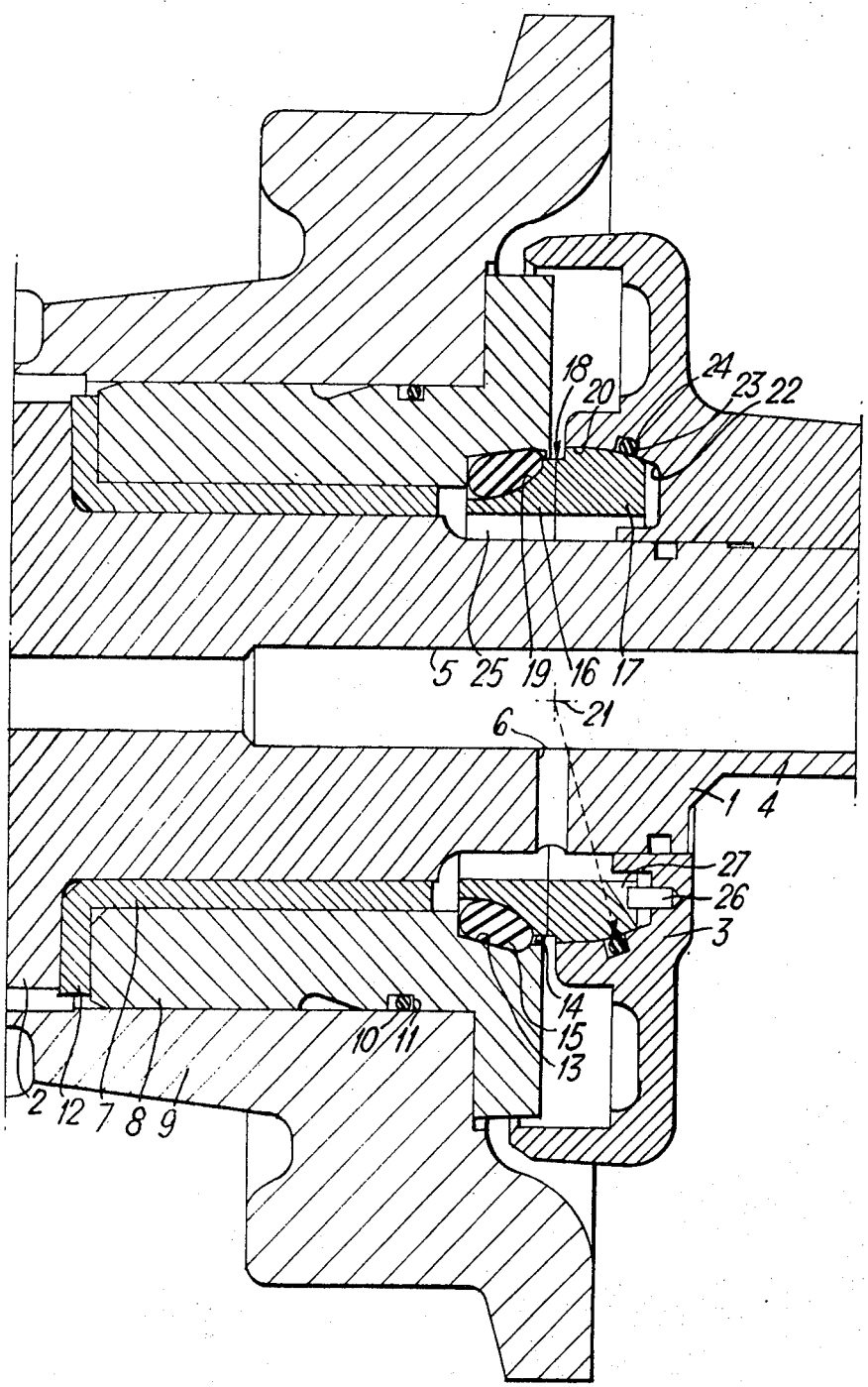

WEAR COMPENSATING SEAL

It has become common practice to seal the bearings for shafts or wheels in arduous conditions by using two relatively rotatable matched members having face-to-face sealing contact surfaces urged together by a resilient member or members. This type of seal sometimes has the disadvantage that if the face-to-face contact surfaces are not perfectly parallel, either through faulty construction or wear in the bearings, uneven wear takes place resulting in a deterioration of the sealing.

The object of the present invention is therefore to mitigate the above disadvantage.

The present invention provides a seal for a bearing, the seal having two relatively rotatable annular matched members that have face-to-face sealing contact surfaces, with one of the members mounted in the bearing for limited rocking movement about a point on the sealing contact surface plane.

The member mounted for rocking movement preferably has a partial spherical surface that co-operates with a complementary partial spherical surface on one of the bearing support elements. Preferably, also the sealing surfaces and the center of the partial spherical surface of the said one member lie on the axis of relative rotation between the members.

The mounting for the rocking member may have a partial spherical surface in contact with a complementary partial spherical surface on the rocking member and means may be provided to prevent relative rotation but permit rocking of such one member relative to the mounting. Preferably, the sealing surfaces and the center of the part spherical surfaces lie in one plane. An additional sealing member may be provided between the partial spherical surfaces of the rocking member and its mount. Preferably, the additional sealing member is an elastomeric O-ring in a groove in the partial spherical surface of the mounting, such groove being of sufficient width to allow rolling movement of at least a part of the O-ring during rocking movement between the partial spherical surfaces.

The non-rocking matched member and the mounting therefor may have tapered surfaces with a large elastomeric O-ring trapped between such surfaces to resiliently urge the other matched member towards the rocking matched member and to provide a seal between the tapering surfaces.

The invention will now be described by way of example with reference to the accompanying drawing which is a central cross section through one half of a track roller for a crawler vehicle running gear. The drawing is presented as half a cross section because the other half is a mirror image but is otherwise identical.

A central shaft 1 having a central flange 2 is non-rotatably supported at its ends in an end cover 3 and has a flat portion 4 on one side to locate it in a vehicle chassis (not shown). Bores 5 and 6 are provided to supply lubricant to a bearing 7, which is interposed between the shaft 1 and a roller insert 8 non-rotatably fitted into engagement with the flanged roller 9. The flanged roller 9 is formed by two halves welded together and rides on the crawler track (not shown). A rubber O-ring 10 is located in a groove 11 in the roller insert 8 to prevent entry of dirt into the bearing 7. The bearing has a collar at 12 and serves both as an end thrust bearing and a cylindrical bearing.

A taper 13 is formed in a step 14 in the outer end of the roller insert 8 and provides an abutment for a large rubber O-ring 15.

Two annular members 16 and 17 are placed in face-to-face contact at a planar sealing interface denoted by 18. A tapering surface 19 is formed on the member 16 behind the face 18 and this abuts the large O-ring and is held in position by it. The radially outer peripheral surface of member 17 is formed as a partial spherical surface 20 having its center 21 on the axis of shaft 1 and in the plane of the interface 18. A complementary surface 22 formed on the end cover 3 receives the surface 20 in bearing engagement. Annular groove 23 in surface 22 holds a rubber O-ring 24 to prevent dirt entering the lubricant chamber 25 enclosed by the assembly. A peg 26 projecting from end cover 3 loosely engages a radial groove 27 in member 17 to prevent continuous relative rotation between the two about the shaft axis.

Limited rocking movement about any axis in the plane of the interface 18 is permitted by the peg 26 and the groove 27.

The end cover 3 is capable of acting through members 17 and 16 to compress O-ring 15 to a required degree to ensure that a predetermined pressure is maintained across interface 18 to maintain effective sealing.

If during assembly a misalignment occurs or if during use, slackness develops in the bearing 7 causing misalignment the annular member 17 is capable of rocking slightly to accommodate the misalignment and preserve even wear across the interface 18.

During rocking movement the O-ring 24 will be capable of rolling slightly, its groove 23 being wide enough to accommodate this.

It is not essential for the large O-ring 15 to perform the function of both a spring and a sealing member to achieve the object of the invention. The same result could be obtained by using a separate spring, rubber or metallic, and a separate sealing member.

I claim:

1. In a rotary assembly having two relatively rotatable elements and a bearing therebetween, a sealing assembly for the bearing, comprising: a pair of sealing members relatively rotatable about an axis and having a planar sealing interface, means mounting one of the sealing members on one of the elements, and means mounting the other sealing member on the other element for limited rocking movement about a rocking point lying in the sealing interface plane.

2. The sealing assembly according to claim 1, including resilient means urging the sealing members into sealing engagement.

3. A sealing assembly according to claim 1, in which the said other sealing member has a part spherical surface adapted to cooperate with a complementary part spherical surface in its associated element, the center of the other sealing member part spherical surface is the rocking point.

4. A sealing assembly according to claim 3, in which the rocking point lies on the said axis.

5. A sealing assembly according to claim 2, in which the element mounting the said other sealing member has a part spherical surface in contact with a complementary part spherical surface of said other sealing member and means are provided to prevent relative rotation but permit rocking of said other member relative to the said element, the spherical center being the rocking point.

6. A sealing assembly according to claim 5, in which an additional sealing member is provided between the part spherical surfaces.

7. A sealing assembly according to claim 6, in which a groove is formed in the part spherical surface of the said element and the additional sealing member is an elastomeric O-ring located in the groove.

8. A sealing assembly according to claim 7, in which said groove is of sufficient width to allow rolling movement of at least a part of the O-ring during rocking movement between the part spherical surfaces.

9. A sealing assembly according to claim 5 in which the means to prevent rotation but permit rocking of the said one member relative to the said element comprises a pin and groove connection.

10. A sealing assembly according to claim 5, in which the one sealing member and its element have tapered surfaces and including a large elastomeric O-ring trapped between such surfaces to resiliently urge said one sealing member towards the said other sealing member and thereby provide a seal between the tapered surfaces.

* * * * *